United States Patent [19]

Steely, Jr. et al.

[11] Patent Number: 5,179,673
[45] Date of Patent: Jan. 12, 1993

[54] SUBROUTINE RETURN PREDICTION MECHANISM USING RING BUFFER AND COMPARING PREDICATED ADDRESS WITH ACTUAL ADDRESS TO VALIDATE OR FLUSH THE PIPELINE

[75] Inventors: Simon C. Steely, Jr., Hudson, N.H.; David J. Sager, Acton, Mass.

[73] Assignee: Digital Equipment Corporation, Maynard, Mass.

[21] Appl. No.: 451,943

[22] Filed: Dec. 18, 1989

[51] Int. Cl.[5] .......................... G06F 9/40; G06F 9/42
[52] U.S. Cl. .................................. 395/375; 364/238.8; 364/DIG. 1; 364/231.8; 364/261.3
[58] Field of Search ........................... 395/375, 800

[56] References Cited

U.S. PATENT DOCUMENTS

| | | | |
|---|---|---|---|
| 4,399,507 | 8/1983 | Cosgrove et al. | 364/200 |
| 4,586,127 | 4/1986 | Horvath | 364/200 |
| 4,594,659 | 6/1986 | Guenther et al. | 364/200 |
| 4,611,278 | 9/1986 | Boothroyd et al. | 364/200 |
| 4,649,472 | 3/1987 | Kim | 364/200 |
| 4,730,248 | 3/1988 | Watanabe et al. | 364/200 |
| 4,773,041 | 9/1988 | Hassler et al. | 364/900 |
| 4,814,978 | 3/1989 | Dennis | 364/200 |
| 4,890,221 | 12/1989 | Gage | 364/200 |
| 4,924,376 | 5/1990 | Ooi | 364/200 |
| 5,008,807 | 4/1991 | Krueger et al. | 364/200 |
| 5,040,137 | 8/1991 | Sherrill | 364/724.16 |

*Primary Examiner*—Thomas C. Lee
*Assistant Examiner*—Alpesh M. Shah
*Attorney, Agent, or Firm*—Kenyon & Kenyon

[57] ABSTRACT

A method and arrangement for producing a predicted subroutine return address in response to entry of a subroutine return instruction in a computer pipeline that has a ring pointer counter and a ring buffer coupled to the ring pointer counter. The ring pointer counter contains a ring pointer that is changed when either a subroutine call instruction or return instruction enters the computer pipeline. The ring buffer has buffer locations which store a value present at its input into the buffer location pointed to by the ring pointer when a subroutine call instruction enters the pipeline. The ring buffer provides a value from the buffer location pointed to by the ring pointer when a subroutine return instruction enters the computer pipeline, this provided value being the predicted subroutine return address.

5 Claims, 3 Drawing Sheets

SUBROUTINE RETURN PREDICTION MECHANISM USING RING BUFFER AND COMPARING PREDICATED ADDRESS WITH ACTUAL ADDRESS TO VALIDATE OR FLUSH THE PIPELINE

FIELD OF THE INVENTION

The present invention relates to the field of changes in the flow-of-control in pipelined computers. More specifically, the invention relates to the processing of instructions associated with subroutines in a highly-pipelined computer.

BACKGROUND OF THE INVENTION

The concept of pipelining of instructions in a computer is well known. The processing of a single instruction is performed in a number of different stages, such as fetching, decoding and execution. In pipelined computers, each of the various stages are working on different instructions at the same time. For example, if the pipeline was only three stages long, the first instruction that has passed through the pipeline is being operated on by the third stage while the second instruction to enter the pipeline will be operated on by the second stage, and while the third instruction to enter the pipeline is being operated on by the first stage. Pipelining is a much more efficient method of processing instructions in comparison with waiting for a single instruction to be completely processed before beginning the processing of a second instruction. In a normal flow of a computer program, it is easy to know which instruction is to enter the pipeline next. In most instances, it is the sequentially next instruction that enters the pipeline so that, for example, instruction 101 will enter the pipeline after instruction 100.

One exception to this normal flow of control is known as a subroutine. A subroutine is a program or a sequence of instructions that can be "called" to perform the same tasks at different points in a program, or even in different programs. For example, instruction 101 may call for a subroutine which begins executing at instruction 200. The subroutine may execute instructions 200-202 and then "return" to the main flow at instruction 102. Further, the same subroutine, comprising instructions 200-202, may be called from a number of different locations in the main flow and return to different locations in the main flow.

Subroutines pose a problem for heavily pipelined computers (those with many stages in the pipeline). Although the instruction which calls a subroutine will contain enough information to determine which is the next instruction to enter the pipeline (i.e., the first instruction in the called subroutine), the return instruction in the subroutine will not contain such information. Instead, a return instruction must pass through all of the stages of the pipeline before the return address will be known from the return instruction. If the computer waited for the return instruction to pass through the pipeline before entering another instruction, there would then be a "bubble" in the pipeline behind the return instruction in which there would be no instructions, thereby lowering the performance of the computer.

To avoid bubbles, a mechanism known as a stack has been used. Basically, a stack will store the return address at the time a subroutine is called, and when the subroutine is completed and control is returned to the main flow by a return instruction, this return address is located in the stack and provided to the pipeline. The pipeline will then be able to return the control to the main flow by entering the proper instruction into the pipeline. By keeping a stack of the return addresses, and using these return addresses to locate the next instruction when there is a return from the subroutine, bubbles in the pipeline are eliminated.

A problem with the stack mechanism is the limited size of the stack and the complicated procedures to deal with stack overruns and underruns when there are a large number of subroutines that have been called. In other words, if the stack contains twelve locations, only twelve subroutines can be called at one time without resorting to the complicated procedures for stack overruns.

There is a need for a mechanism that provides return addresses and eliminates bubbles in the pipeline, but without requiring the complicated procedures necessary when a stack is used.

SUMMARY OF THE INVENTION

This and other needs are met by the present invention which provides a ring buffer that simulates the characteristics of a stack mechanism to predict a subroutine return address. The ring buffer stores a predicted return address in one of its ring buffer locations every time a subroutine is called (i.e., enters the pipeline). Whenever a subroutine return instruction enters the pipeline, the predicted return address is provided to the pipeline from the ring buffer so that the appropriate instruction from the main flow can enter the pipeline. In this way, bubbles in the pipeline are eliminated.

The ring buffer used in the present invention can be of limited size and have, for example, eight locations for storing eight different return addresses. If more than eight subroutines are called without any returns, then, in ring buffer fashion, the earliest stored return addresses will be overwritten by the more recent return addresses that have been stored in the ring buffer. Eventually, when a subroutine associated with a return address that has been overwritten has completed processing through the pipeline, and the flow of control is changed to the main flow, the predicted return address in the ring buffer will be incorrect. The actual return address for the return instruction will be known at the end of the pipeline when the return instruction has passed all the way through the pipeline. This actual return address will be compared at this time with the predicted return address in the ring buffer. When the predicted return address is wrong, as shown by the comparison, the pipeline is flushed and started again from the instruction using the actual return address.

For well-behaved programs, return addresses are predicted correctly over 90% of the time.

DETAILED DESCRIPTION

Figure 1:
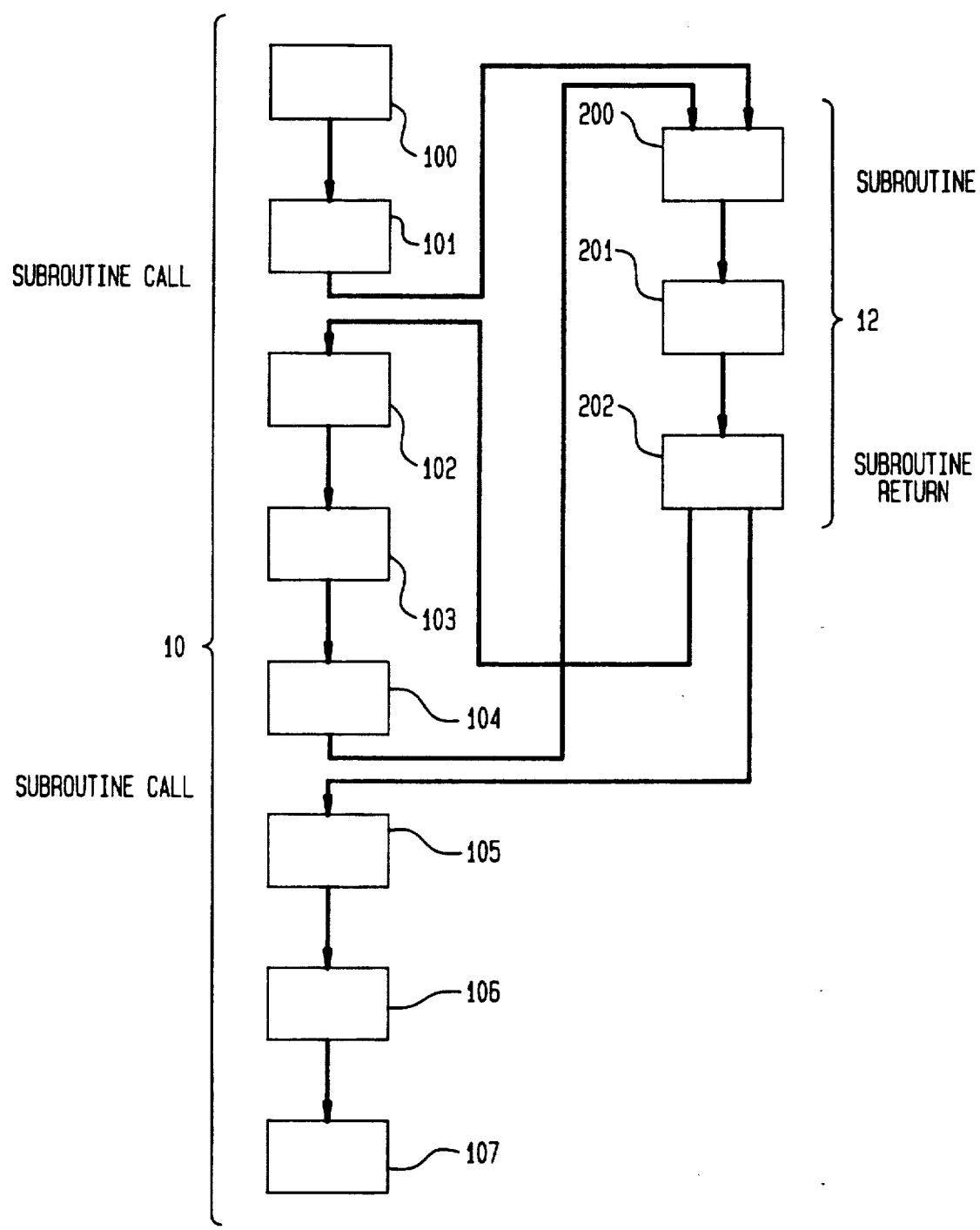
FIG. 1 shows a block diagram of a program having a main flow and a subroutine.

FIG. 1 is a block illustration of a flow of control of a computer program. Instructions 100-107 are the instructions that make up a main flow of instructions 10. A secondary flow of instructions 200-202 comprise a subroutine 12. In the example of FIG. 1, the subroutine 12 is called from one of two instructions 101 and 104. When the subroutine 12 is called, from instruction 101 for example, the computer executes instructions 200,201 and returns to the main flow 10 return with instruction 202. Execution of the main flow 10 begins again at instruction 102. However, if the subroutine 12 was called from instruction 104, the subroutine 12 must return the flow of execution to the main flow 10 at instruction 105.

As can be seen from the above flow description, the main flow 10 can be returned to from the subroutine 12 at one of two places. In a larger program, it is possible for the return to the main flow 10 to be made to any number of places.

The performance of an instruction in a pipelined computer involves a number of operations performed in sequential stages in the pipeline. Pipelining in computers is well-known, and involves operating on separate instructions in the separate stages of the pipeline simultaneously. For example, if there are five stages in the pipeline, a different instruction will be in each of the five stages at the same time, with different operations being performed on the individual instructions at each stage. The pipelining of instructions is a much more efficient method of processing instructions than waiting for each instruction to complete before beginning the processing of the next instruction.

Figure 2:
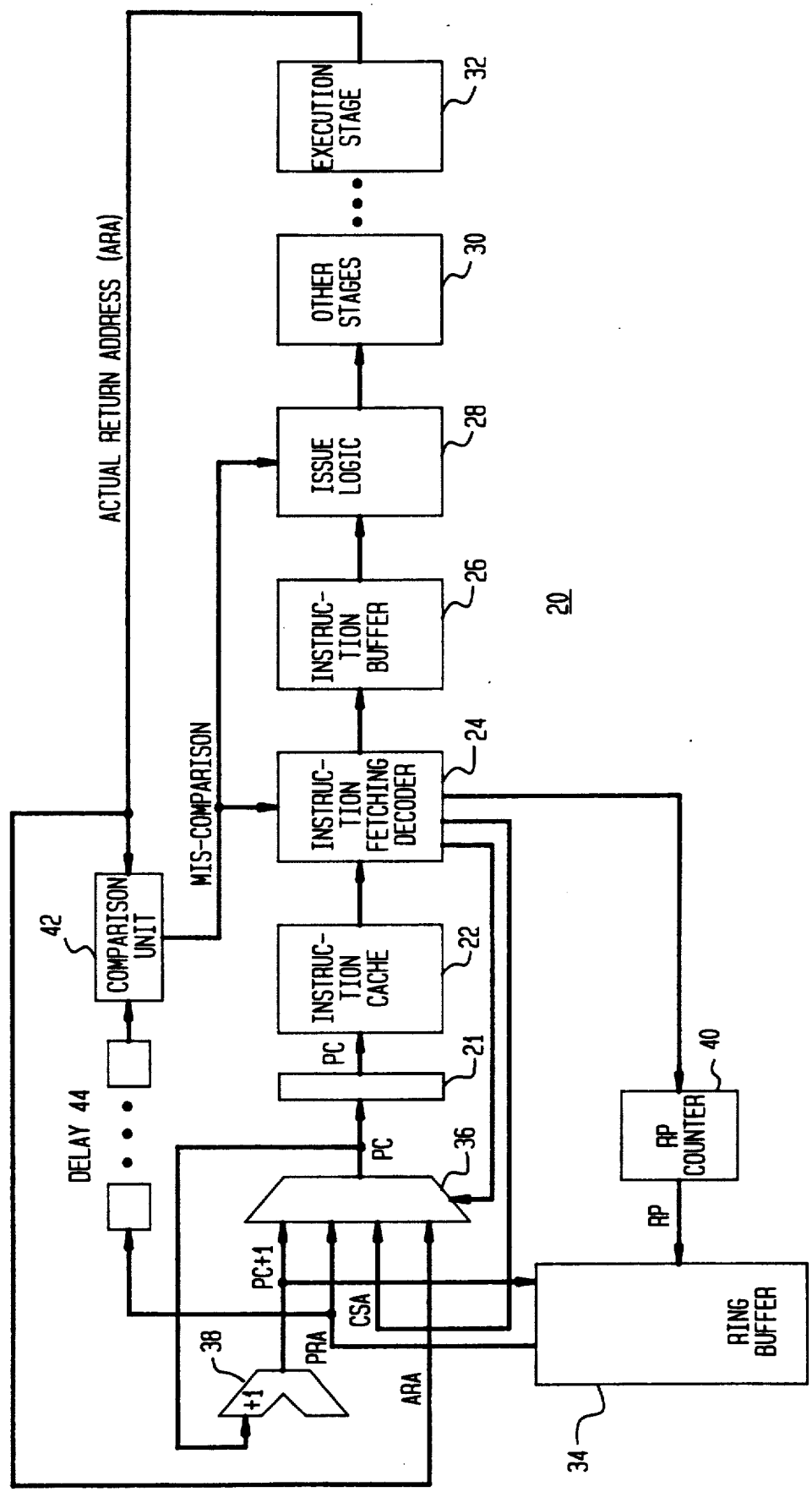
FIG. 2 shows a block diagram of a pipeline using an embodiment of the present invention.

A pipeline constructed in accordance with the present invention is illustrated in FIG. 2 and will be referred to with reference numeral 20. The pipeline 20 has a program counter buffer 21 that buffers a program count or "PC" to an instruction cache 22. A number of instructions are stored in the instruction cache 22 at any time. When the instruction cache 22 receives the PC from the program counter buffer 21, a coded instruction is sent to an instruction fetching decoder 24. As its name implies, the decoder 24 decodes the instruction from instruction cache 22 that has been pointed to by the program counter buffer 21. In accordance with the pipeline technique, the decoder 24 will be decoding a first instruction in the pipeline while a second instruction is being looked up in the instruction cache 22.

The decoded instruction is sent from decoder 24 to an instruction buffer 26, which merely buffers the decoded instruction. Following the instruction buffer 26 is issue logic 28, which performs a scheduling type of function. The remaining stage or stages in the pipeline have reference numeral 30, and can be any number of stages. The final stage in the pipeline 20 is the execution stage 32 in which the instruction is executed. Since there are six stages in the pipeline 20 of FIG. 2, up to six instructions can be processed simultaneously.

Normally, after one instruction has been called from the instruction cache 22, such as instruction 100, the next instruction will be called from the cache 22 and will be the sequentially next instruction, such as instruction 101. If it is a call instruction, such as instruction 101, the decoded instruction itself will provide the PC for the next instruction that is to be executed. In this case, the next instruction to be executed after the call instruction will be the first instruction of the subroutine, instruction 200. In this manner, by using either the next sequential instruction (PC+1) or the instruction pointed to by a decoded call instruction, the pipeline 20 will be kept full of instructions. The pipeline 20 is being used inefficiently if there are bubbles (no instructions) in one or more of the stages in the pipeline. Such a bubble could potentially occur with a subroutine return instruction, such as instruction 202, as described below.

A bubble in the pipeline 20 can occur with a subroutine return instruction since the actual place of return to the main flow (the actual return address) will not be known until the subroutine return instruction has been executed in the execution stage 32. If no further measures are taken, stages 22-30 will be empty behind a subroutine return instruction since the address of the next instruction will not be known. As stated earlier, this bubble represents inefficient use of the pipeline 20.

In order to prevent bubbles in the pipeline 20, there must be a mechanism for predicting what is the next instruction to be processed after the return instruction in the pipeline 20. Some computer architectures allow the use of stacks which store each return address every time a subroutine is called. The stack stores these return addresses in a last-in, first-out manner, so that the last return address stored in the stack will be the first return address issued from the stack when the next return instruction is decoded in the pipeline. However, some computer architectures do not provide or allow for the use of stacks.

The present invention provides the basic functionality of a stack, without actually using a stack apparatus. (Although the invention is useful in architectures without stacks, the invention is also useful in architectures that do use stacks.) Instead, a ring buffer 34 is used, as seen in FIG. 2. The ring buffer 34 holds a relatively small number of predicted return addresses. As will be explained in more detail below, the predicted return address in the ring buffer 34 is used to fetch the next instruction from the instruction cache 22 when the instruction fetching decoder 24 has decoded a return address. The pipeline 20 will then continue operating on subsequent instructions without forming a bubble in the pipeline. If the predicted return address eventually turns out to be incorrect, the sequence of instructions will be aborted and execution will continue using the correct sequence of instructions.

The ring buffer 34 can be an eight-deep buffer, for example, with each location storing a predicted return address. As stated earlier, the instruction cache 22 receives the program count (PC) from the program counter buffer 21 to locate an instruction. The PC is also sent to an adder 38, which adds the value 1 to the PC. This value, PC+1, is sent to the ring buffer 34 and to a multiplexer 36. During a normal sequence of instructions, without a subroutine or a branch, one instruction will follow another instruction sequentially such that PC=PC+1. If the program count for the first instruction is PC, the program count for the next instruction will be PC+1, and a third instruction will be PC+2. In other implementations, the incremental value will be different then 1, as where the address of the instruction following instruction 300 is 304, and the next 308. In that case, the value of the PC will change by 4, so that PC=PC+4.

The multiplexer 36 also receives inputs from the instruction fetching decoder 24. One input is a called subroutine address (CSA) contained within a call instruction that is received from instruction cache 22 and decoded in decoder 24. The called subroutine address is selected from the multiplexer 36 to be the PC for the instruction cache 22 whenever the decoded instruction is a call instruction. If the instruction that is decoded in the instruction fetching decoder 24 is a return instruction, and not a call instruction, a signal is sent to the ring buffer 34 through an RP counter 40. The RP counter 40 contains a ring-pointer (RP) that indexes into the ring buffer 34. The ring buffer 34 sends a predicted return address (PRA) pointed to by the RP to the multiplexer 36. Under control of a signal from the instruction fetching decoder 24, the multiplexer 36 will select the PRA to be the PC for the instruction cache 22. The operation of the ring buffer 34 will be described later.

So far, three inputs to the multiplexer 36 for selecting the PC have been described. The first of these is PC+1, which is selected by the multiplexer when the instruction decoded by the instruction fetching decoder 24 is neither a call nor a return instruction. The second input to the multiplexer 36 is the called subroutine address (CSA), contained in the decoded instruction, and sent by the instruction fetching decoder 24 to the multiplexer 36. The CSA is used whenever the decoder 24 has decoded a call instruction. The third input to the multiplexer 36 that has been described thus far is the predicted return address (PRA) that is sent by the ring buffer 34 to the multiplexer 36 whenever a return instruction has been decoded by the decoder 24. The operation of the ring buffer 34 will now be described.

As mentioned earlier, the ring buffer 34 comprises a finite number of buffer locations that store predicted return addresses. The buffer locations in the ring buffer 34 are indexed by the ring-pointer (RP) kept in the RP counter 40. The operation of the RP counter is simple. Whenever the RP counter 40 receives the signal from the decoder 24 that the decoded instruction is a call instruction, the RP counter 40 is incremented by one so that it points to the next higher buffer location. In equation form, upon a subroutine call, RP=RP+1. When the instruction decoded by decoder 24 is a return instruction, RP is decremented by one. This gives the equation that RP=RP−1 for a subroutine return instruction.

The value placed into the ring buffer 34 at the location pointed to by RP upon the decoding of a subroutine call instruction is the value of PC+1. In other words, the sequentially next address after the address of the call instruction is loaded into the location in ring buffer 34 pointed to by RP. This value, PC+1, then becomes the PRA. The PRA will be supplied by the ring buffer 34 to the multiplexer 36 when a subroutine return instruction has been decoded by decoder 24. The loading of PC+1 and the return of the PRA into and out of the location pointed to by RP is performed according to a ring buffer control signal issued by the decoder 24.

An example of the operation of the ring buffer 34 now follows:

The first instruction to enter the pipeline 20 is instruction 100. This is looked up in the instruction cache 22 using PC=100. The instruction is decoded in the decoder 24, and since it is neither a subroutine call or return, the control signal from the decoder 24 selects the next PC to be PC+1. In this case, the value of PC+1=101, so that instruction 101 is sent from the instruction cache 22 to the decoder 24.

Instruction 101 is a subroutine call (see FIG. 1) so that the decoder 24 will send a signal to the RP counter 40. The RP in RP counter 40 is incremented from, for example, RP=3, to RP=4, so that it points to a new buffer location RP(4) in the ring buffer 34. The value of PC+1, in this instance, 101+1=102, is stored in the ring buffer 34 at ring buffer location RP(4).

The decoder 24, upon decoding the call instruction 101, has also sent a control signal to the multiplexer 36, and sent the called subroutine address (CSA) to be the next PC. The CSA is able to be sent by the decoder 24 to the multiplexer 36 since it is contained in the subroutine call instruction 101 that has been decoded.

The subroutine 12 is executed such that instruction 200 is retrieved from the instruction cache 22 and decoded. Instruction 201 will then be fetched from the instruction cache 22 (PC=PC+1=201) since instruction 200 is neither a call nor a return instruction. Similarly, instruction 202 will follow instruction 201 in the pipeline. However, instruction 202 is a subroutine return instruction.

When subroutine return instruction 202 is decoded by the decoder 24, potentially the next instruction could be either the instruction 102 or 105. (See FIG. 1.) Using a ring buffer 34, the correct return address can usually be provided. Upon decoding a return instruction, the decoder 24 sends a signal to the RP counter 40. The PRA pointed to by the RP contained in RP counter 40 will be provided to the multiplexer 36. In this example, the PRA associated with instruction 102, which has been stored at RP(4), is provided to the multiplexer 36. The decoder 24 sends a control signal to the multiplexer 36 to cause it to select PRA to be the next PC. Thus, using the supplied PRA, instruction 102 will be sent from instruction cache 22 to be decoded by the decoder 24. Also, the RP in RP counter 40 is decremented so that it now points to RP(3).

The above is a description of the operation of the pipeline 20 when the PRA is correct. However, in some circumstances, the PRA will not be correct. This can happen, for example, if the subroutine causes a return to a different location in the main flow 10 than the instruction immediately following the call instruction. The fact that the PRA is incorrect will not be known until the return instruction has completely gone through the pipeline 20 and been executed. It is at that point that the actual return address for the return instruction becomes known. In the meantime, a number of instructions following the return instruction have entered and are in the various stages of the pipeline 20. The pipeline 20 must recognize that the actual return address is different from the predicted return address and take corrective measures.

The actual return address (ARA) is sent from the end of the pipeline to a compare unit 42. At the same time that the compare unit 42 receives the ARA, it also receives the PRA. The PRA has been sent via a series of delay latches 44 to the compare unit 42. The PRA and the ARA are compared. If there is a mis-comparison, a mis-comparison signal is sent to the decoder 24 and to the issue logic 28. The mis-comparison signal causes a flushing of the pipeline 20 of all the instructions which entered the pipeline 20 after the return instruction. The multiplexer 36 receives at its fourth input the ARA so that the PC to go to the instruction cache 22 will now become this ARA after a mis-comparison has been recognized. A new sequence of instructions, beginning with the instruction at the actual return address (ARA), are then processed by the pipeline 20.

The ring buffer 34 has a limited number of buffer locations. This can lead to a mis-predicted return address being provided by the ring buffer 34. As an example, assume that the ring buffer 34 has eight locations RP(0)−RP(7). If eight subroutines have been called, with no returns having been made, the ring buffer 34 will be full. When a ninth subroutine call has been made, the first ring buffer location, RP(0), will be overwritten in standard ring buffer manner. The PRA that was previously in RP(0) is essentially lost by the overwriting of a new PRA into that location. Thus, if nine subroutine returns are issued, the correct subroutine return address for the first subroutine that was called will no longer be found in RP(0). Instead, the new value of the PRA that was stored in RP(0) will be issued as the PRA. This PRA will be incorrect as will eventually be determined by a comparison of the PRA with the ARA. The appropriate corrective measures as described earlier will there be taken upon recognition of the mis-comparison.

Events can occur during the execution of a program by a pipelined computer that require the pipeline to abort all instructions in all the stages of the pipeline. This is sometimes called "flushing" the pipeline. All the work that was going on in the pipeline 20 at this time will be discarded. These instructions that are discarded are called the "shadow". Typically the front end of the pipeline will then begin executing instructions at some error-handling address.

For the purpose of this description, the events that flush the pipeline will be referred to as "traps". Examples of traps are branch mis-prediction, virtual memory page fault, resource busy, and parity error in some hardware.

To enhance the performance of the subroutine return prediction mechanism, the ring buffer 34 needs to be backed up to the point it was at when the instruction that caused the trap passed through the ring buffer stage of the pipeline 20. Keeping copies of every change that occurs to the ring buffer 34 until it is known that no trap will occur is too expensive a solution.

Figure 3:
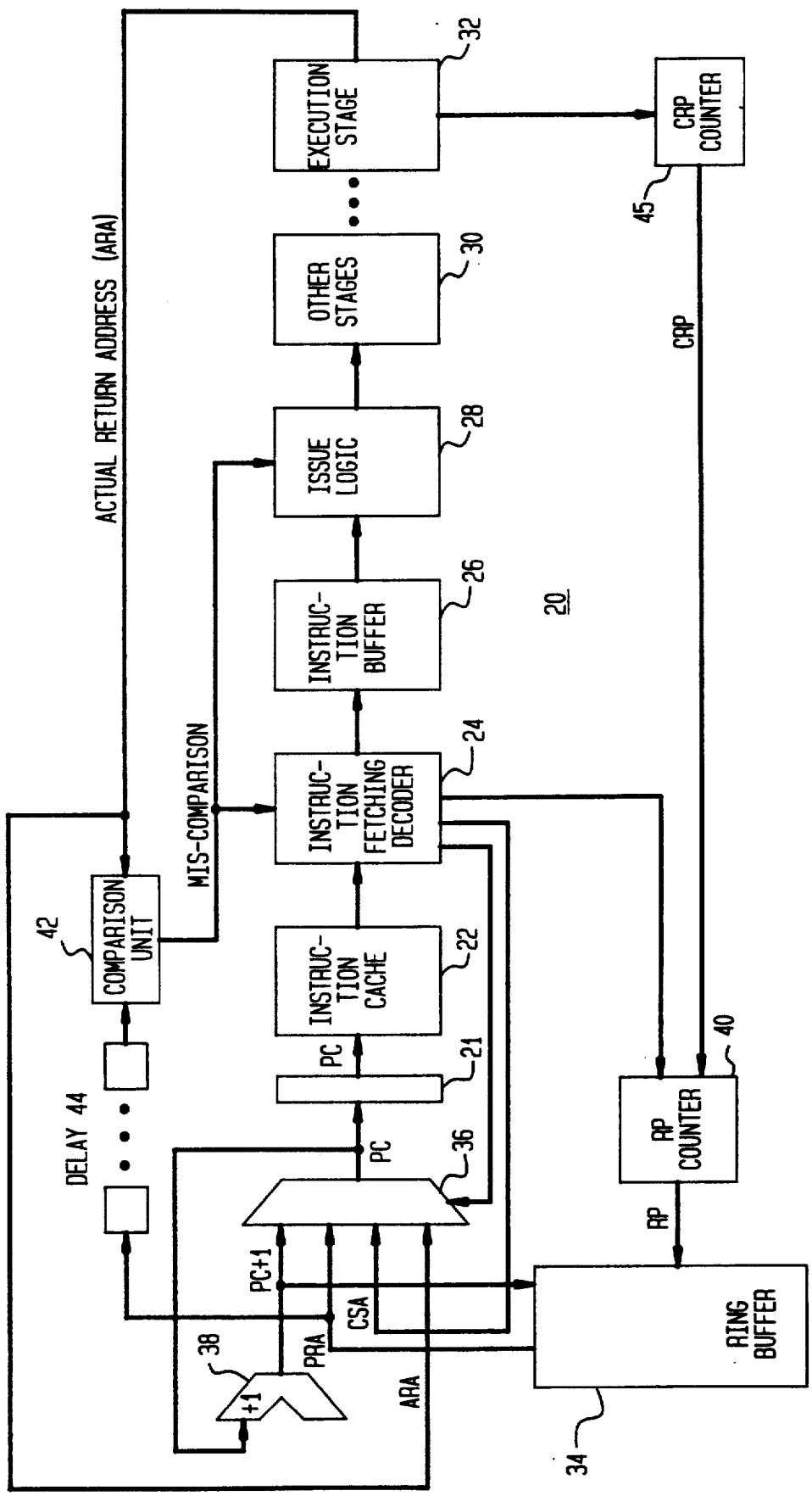
FIG. 3 shows a block diagram of a pipeline using another embodiment of the present invention.

The embodiment of FIG. 3 solves this problem by providing another ring pointer, the "confirmed ring pointer" or CRP kept in a CRP counter 45. The CRP is changed similarly to the RP, such that it is incremented when a subroutine call instruction is seen and is decremented when a subroutine return instruction is seen. The difference is that the CRP counter 45 watches the instructions that reach the last stage of the pipeline 20. Changes are made to the CRP based on the instructions that are at the last stage. When a trap occurs, the RP in the RP counter 40 will be set to the value of the CRP in the CRP counter 45.

This preserves the RP to be in correct sync when new instructions are begun to be executed after a trap. There may have been some subroutine call instructions that occurred in the shadow of the trap which wrote over entries in the ring buffer 34 and subsequent predictions for subroutine return instructions will be incorrect. However, the RP will be in sync and as soon as the RP passes over the incorrect entries, the ring buffer 34 will again be in a good state.

The present invention is not limited to the embodiment shown, but finds application with pipelines of various sizes and with ring buffers of various sizes.

What is claimed:

1. An arrangement for producing a predicted subroutine return address in response to entry of a subroutine return instruction in a computer pipeline, comprising:
   (a) means for detecting the entry into the computer pipeline of a subroutine call instruction or the subroutine return instruction;
   (b) a ring pointer counter that contains a ring pointer that is incremented when the subroutine call instruction enters the computer pipeline, and is decremented when the subroutine instruction enters the computer pipeline;
   (c) a ring buffer coupled to said ring pointer counter and having buffer locations, an input and an output, said ring buffer storing a value present at said input into the buffer location pointed to by said ring pointer when the subroutine call instruction enters the computer pipeline and providing a value at said output from the buffer location pointed to by the ring pointer when the subroutine return instruction enters the computer pipeline, said value at said output being the predicted subroutine return address; and
   (d) a comparison unit coupled to said ring buffer and to the computer pipeline, the comparison unit comparing an actual return address produced by the computer pipeline in response to the processing of the subroutine return instruction with the predicted return address for that return instruction, and having an output at which is provided a mis-comparison signal when the actual return address is not the same as the predicted return address, the mis-comparison signal being coupled to the computer pipeline to cause the computer pipeline to flush the computer pipeline when the actual return address is not the same as the predicted return address.

2. A computer pipeline comprising:
   a) an instruction cache which stores coded instructions and has an input that receives a program count which indexes the coded instructions, and an output at which the indexed coded instructions are provided;
   b) an instruction fetching decoder having an input coupled to the instruction cache output and which decodes the coded instructions, and having as outputs:
      i) a subroutine call address when the coded instruction is a subroutine call instruction,
      ii) a multiplexer control signal which indicates whether the coded instruction is a return instruction, the call instruction or neither,
      iii) a ring pointer counter control signal which is a first value when the coded instruction is a return instruction and a second value when the coded instruction is the call instruction, and
      iv) a decoded instruction;
   b) an execution stage coupled to the instruction fetching decoder which executes the decoded instruction;
   c) a program counter coupled to the input of the instruction cache and having an output at which is provided the program count to the instruction cache input;
   d) a multiplexer having a plurality of inputs, a control input coupled to the multiplexer control signal output of the instruction fetching decoder, and an output coupled to the program counter input;
   e) an adder having a an input coupled to the output of the program counter and an output coupled to one of said multiplexer inputs at which is provided a value equal to the program count plus one;
   f) a ring pointer counter having an input coupled to the instruction fetching decoder to receive the ring pointer counter control signal, and containing a ring pointer which points to buffer locations in response to the ring pointer counter control signal, said ring pointer being incremented when the instruction fetching decoder decodes a subroutine call instruction and being decremented when the instruction fetching decoder decodes a subroutine return instruction;

g) a ring buffer having an input coupled to the adder output, a plurality of buffer locations, and an output coupled to one of said multiplexer inputs, said ring buffer storing said value received from the adder output as a return value in the buffer location pointed to by said ring pointer when a subroutine call instruction is decoded and providing said return value from the buffer location pointed to by the ring pointer at the ring buffer output when a subroutine return instruction is decoded, said return value at said ring buffer output being the predicted subroutine return address;

h) the multiplexer operating to output:
  i) the subroutine call address when the multiplexer control signal is indicative of the subroutine call instruction,
  ii) the predicted return address when the multiplexer is indicative of the subroutine return instruction, and
  iii) the output of the adder when the multiplexer control signal is indicative of neither the subroutine call instruction nor the subroutine return instruction; and i) a comparison unit coupled to said ring buffer and to said execution stage, the comparison unit comparing an actual return address produced by the execution stage in response to the processing of the return instruction with the predicted return address for that return instruction, and having an output at which is provided a mis-comparison signal when the actual return address is not the same as the predicted return address, the mis-comparison signal being coupled to the computer pipeline to cause the computer pipeline to flush the computer pipeline when the actual return address is not the same as the predicted return address.

3. The pipeline of claim 2, further comprising means for processing a correct sequence of instructions beginning with the instruction indicated by the actual return address, the means coupled to the instruction cache and the ring pointer counter and, when the mis-comparison signal indicates that the predicted return address and the actual return address do not match, operating to input the actual return address into the instruction cache and to return the ring pointer counter to its pre-trap state.

4. The pipeline of claim 2, further comprising a confirmed ring pointer counter coupled to the execution stage and the ring pointer counter, and containing a confirmed ring pointer that is incremented when the execution stage receives a subroutine call instruction and is decremented when the execution stage receives a subroutine return instruction, and which provides the confirmed ring pointer to the ring pointer counter to replace the ring pointer when a trap occurs.

5. A method of predicting subroutine return addresses in a pipelines computer comprising:
  (a) storing in one of a plurality of buffer locations in a ring buffer a value equal to one plus an address of a call instruction in response to that call instruction;
  (b) pointing to the buffer location containing the most recently stored value;
  (c) providing the pointed to most recently stored value as an output in response to a return instruction, said output being the predicted subroutine return address;
  (d) pointing to the buffer location containing the next most recently stored value;
  (e) comparing an actual return address produced by the computer pipeline in response to the processing of the return instruction with the predicted return address for that return instruction to determine whether the predicted return address is valid; and
  (f) when the determination indicates that the predicted return address is not valid, generating a mis-comparison signal to cause a flush of the computer pipeline.

* * * * *